US012559240B2

(12) United States Patent
Hein et al.

(10) Patent No.: US 12,559,240 B2
(45) Date of Patent: Feb. 24, 2026

(54) INTEGRATED ICE PROTECTION SYSTEM

(71) Applicant: Goodrich Corporation, Charlotte, NC (US)

(72) Inventors: Brandon Hein, Stow, OH (US); Casey Slane, Tallmadge, OH (US); Jeffrey Martin Werbelow, Phoenix, AZ (US); Galdemir Cezar Botura, Copley, OH (US); Matthew Hamman, Fairview Park, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1089 days.

(21) Appl. No.: 17/568,240

(22) Filed: Jan. 4, 2022

(65) Prior Publication Data

US 2023/0122076 A1 Apr. 20, 2023

Related U.S. Application Data

(60) Provisional application No. 63/256,676, filed on Oct. 18, 2021.

(51) Int. Cl.
| | |
|---|---|
| *B64D 15/12* | (2006.01) |
| *B32B 9/00* | (2006.01) |
| *B32B 9/04* | (2006.01) |
| *B64D 15/20* | (2006.01) |
| *H05B 3/14* | (2006.01) |

(52) U.S. Cl.
CPC .............. *B64D 15/12* (2013.01); *B32B 9/007* (2013.01); *B32B 9/045* (2013.01); *B64D 15/20* (2013.01); *H05B 3/145* (2013.01); *B32B*

*2255/10* (2013.01); *B32B 2457/00* (2013.01); *B32B 2605/18* (2013.01); *H05B 2214/04* (2013.01)

(58) Field of Classification Search
CPC .......... H05B 3/145; H05B 3/286; H05B 3/36; B32B 9/045; B32B 2255/10
See application file for complete search history.

(56) References Cited

U.S. PATENT DOCUMENTS 10,457,405 B1 * 10/2019 Hardman ................ B32B 7/025
10,875,632 B2 12/2020 Botura et al.
(Continued)

OTHER PUBLICATIONS

EP Search Report for Application No. 22202026.5 dated Feb. 17, 2023, 12 pages.

*Primary Examiner* — Thien S Tran
(74) *Attorney, Agent, or Firm* — CANTOR COLBURN LLP

(57) ABSTRACT

A system for controlling ice accumulation on a surface of an aircraft, the system includes a carbon nano-tube (CNT) heater comprising: a CNT layer; a first encapsulation layer disposed on a first side of the CNT layer formed of a first encapsulation layer thermoplastic material; and a second encapsulation layer disposed on a second side of the CNT layer formed of a second encapsulation layer thermoplastic material. The system also includes a fore composite structure that includes a fore composite structure thermoplastic material disposed on the first side of CNT heater, an aft composite structure that includes an aft composite structure thermoplastic material disposed on the first side of CNT heater and a sensor layer disposed between the CNT heater and the one of the fore and aft composite structures.

13 Claims, 5 Drawing Sheets

200

(56) References Cited

U.S. PATENT DOCUMENTS

| 11,167,856 | B2 | 11/2021 | Jacob et al. | |
|---|---|---|---|---|
| 2014/0014640 | A1* | 1/2014 | Calder | B64D 15/12 |
| | | | | 219/202 |
| 2016/0077027 | A1* | 3/2016 | Sweers | G01N 27/20 |
| | | | | 324/654 |
| 2018/0370637 | A1 | 12/2018 | Hu et al. | |
| 2019/0112054 | A1* | 4/2019 | Zhao | B64D 15/12 |
| 2019/0135443 | A1* | 5/2019 | Botura | B64D 15/00 |
| 2019/0248501 | A1* | 8/2019 | Smith | B64D 15/22 |
| 2020/0107408 | A1 | 4/2020 | Torrico et al. | |
| 2021/0009273 | A1 | 1/2021 | Botura et al. | |
| 2021/0179276 | A1 | 6/2021 | Hu et al. | |
| 2021/0231592 | A1 | 7/2021 | Zadell et al. | |

* cited by examiner

| Temperature Nodes |
| Strain Nodes |

INTEGRATED ICE PROTECTION SYSTEM

CROSS-REFERENCE TO RELATED APPLICATIONS

This application claims the benefit of U.S. Provisional Application No. 63/256,676 filed Oct. 18, 2021, the disclosure of which is incorporated herein by reference in its entirety.

BACKGROUND

The present invention relates to ice protection systems, and more specifically, an integrated ice protection system that includes sensors and a carbon nano-tube heater encapsulated in a thermoplastic.

Aircraft can be exposed to weather conditions that allow ice to form on its surfaces. Ice can be formed on the surfaces of the aircraft such as the windscreen, wings, tail, and air intake components before or during flight. The build up of ice can lead to adverse operation such as blocking needed engine airflow or inhibiting the operation of the wings or other components. In addition, damage to other components and the safety of the aircraft and passengers can result. Aircraft equipped with heating components can include electric heaters to protect the aircraft. There may be a need to ensure the proper operation of the heating components over the life of the aircraft.

Carbon nanotubes (CNT) are allotropes of carbon having a generally cylindrical nanostructure, and have a variety of uses in nanotechnology, electronics, optics and other materials sciences. CNT is both thermally and electrically conductive. Due to these properties, CNT can be used as a heating element to prevent icing on aircraft or other vehicles.

CNT heater mats or other more standard etched metallic foil or wire-wound heater mats are typically manufactured with thermoset materials. This construction typically leads to a multi-step curing process leading to high manufacturing costs. Typical materials also have lower temperature limits which can lead to design limitations. This construction is typically thicker than needed which requires a higher power demand. These materials also do not allow for heater mat repair and require replacement.

BRIEF DESCRIPTION

Disclosed is a system for controlling ice accumulation on a surface of an aircraft. The system includes: a carbon nano-tube (CNT) heater that includes: a CNT layer; a first encapsulation layer disposed on a first side of the CNT layer formed of a first encapsulation layer thermoplastic material; and a second encapsulation layer disposed on a second side of the CNT layer formed of a second encapsulation layer thermoplastic material. The system also includes a fore composite structure that includes a fore composite structure thermoplastic material disposed on the first side of CNT heater, an aft composite structure that includes an aft composite structure thermoplastic material disposed on the first side of CNT heater and a sensor layer disposed between the CNT heater and the one of the fore and aft composite structures.

In addition to one or more of the features described above, or as an alternative to any of the foregoing embodiments, the system can further include a controller that receives information from sensors in the sensor layer and controls the CNT heater based on the received information.

In addition to one or more of the features described above, or as an alternative to any of the foregoing embodiments, the system can further include a low ice adhesion coating layer disposed on the fore composite structure on a side of the fore composite structure opposite the CNT heater.

In addition to one or more of the features described above, or as an alternative to any of the foregoing embodiments, the sensor layer can include one or both of temperature and strain sensors.

In addition to one or more of the features described above, or as an alternative to any of the foregoing embodiments, the sensor layer can include fiber optic sensors.

In addition to one or more of the features described above, or as an alternative to any of the foregoing embodiments, the fore and aft composite structure thermoplastic materials can be the same thermoplastic material.

In addition to one or more of the features described above, or as an alternative to any of the foregoing embodiments, the fore and aft composite structure thermoplastic materials can be the same as thermoplastic material of the first and second encapsulation layer thermoplastic materials.

Also disclosed in another system for controlling ice accumulation on a surface of an aircraft. This system includes a carbon nano-tube (CNT) heater comprising: a CNT layer; a first encapsulation layer disposed on a first side of the CNT layer formed of a first encapsulation layer thermoplastic material; and a second encapsulation layer disposed on a second side of the CNT layer formed of a second encapsulation layer thermoplastic material. This system also includes a fore composite structure that includes a fore composite structure thermoplastic material disposed on the first side of CNT heater; an aft composite structure that includes an aft composite structure thermoplastic material disposed on the first side of CNT heater; and a low ice adhesion coating layer disposed on the fore composite structure on a side of the fore composite structure opposite the CNT heater.

In addition to one or more of the features described above, or as an alternative to any of the foregoing embodiments, the second system can further include a controller that receives information from sensors that measure temperature or strain in the system and controls the CNT heater based on the received information.

In addition to one or more of the features described above, or as an alternative to any of the foregoing embodiments, in the second system the fore and aft composite structure thermoplastic materials can be the same thermoplastic material.

In addition to one or more of the features described above, or as an alternative to any of the foregoing embodiments, in the second system the fore and aft composite structure thermoplastic materials can be the same as thermoplastic material of the first and second encapsulation layer thermoplastic materials.

Also disclosed are methods of forming either of the above systems. In one embodiment, the method includes: receiving a carbon nano-tube (CNT) heater comprising: a CNT layer, a first encapsulation layer disposed on a first side of the CNT layer formed of a first encapsulation layer thermoplastic material a second encapsulation layer disposed on a second side of the CNT layer formed of a second encapsulation layer thermoplastic material; receiving a fore composite structure that includes a fore composite structure thermoplastic material; receiving a sensor layer that includes one or sensors; disposing the fore composite structure on the first side of CNT heater; receiving an aft composite structure that includes an aft composite structure thermoplastic material;

disposing the sensor layer the second side of the CNT heater structure; disposing the aft composite structure on the second side of CNT heater such that the sensor layer is between the CNT heater and the aft composite structure to form an assembly that includes the fore composite structure, the CNT heater, the sensor layer and the aft composite structure; and heating the assembly to at least partially melt the fore and aft composite structure thermoplastics and the first and second encapsulation layer thermoplastic to bond the assembly together.

In addition to one or more of the features described above, or as an alternative to any of the foregoing embodiments, in the method heating can include providing heat with the CNT heater.

In addition to one or more of the features described above, or as an alternative to any of the foregoing embodiments, the method can further include disposing a low ice adhesion coating layer on the fore composite structure on a side of the fore composite structure opposite the CNT heater.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

According to an embodiment, a heater mat is disclosed. The mat includes carbon nanotube heating elements in a mat that is bonded internally within a thermoplastic structure.

Figure 1:
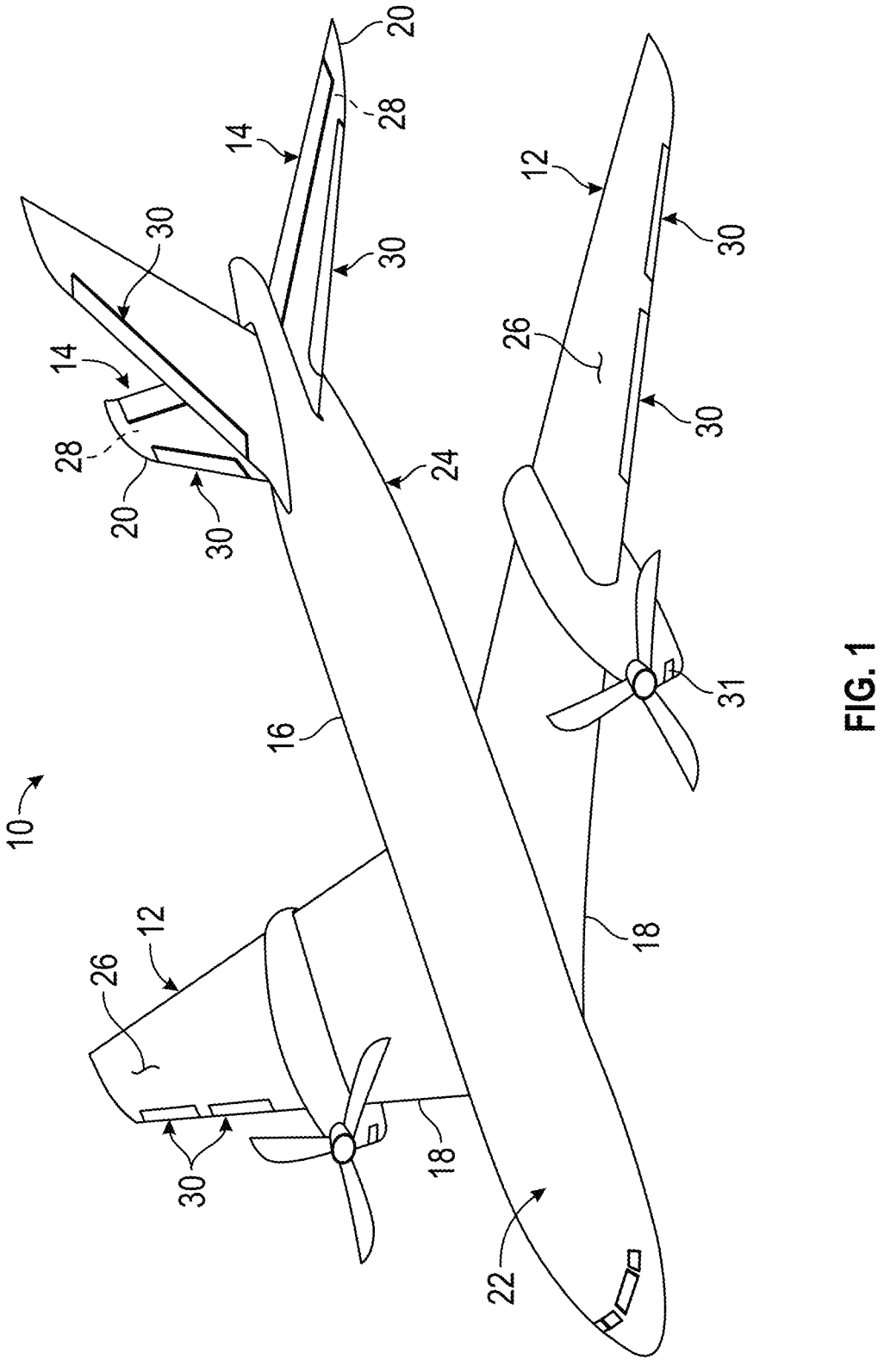
FIG. 1 is a perspective view of an aircraft showing different locations where a de-icing assembly to embodiments herein can be utilized.

FIG. 1 is a perspective view of aircraft 10 including wings 12, horizontal stabilizers 14, and fuselage 16. Wings 12 include leading edges 18 and horizontal stabilizers 14 include leading edges 20. Of course, the aircraft could also include vertical stabilizers and the teachings herein are also applicable to them.

In the illustrated configuration of FIG. 1, aircraft 10 is of a fixed-wing design. Fuselage 16 extends from nose section 22 to tail section 24, with wings 12 fixed to fuselage 16 between nose section 22 and tail section 24. Horizontal stabilizers 14 are attached to fuselage 16 on tail section 24. Wings 12 and horizontal stabilizers 14 function to create lift and to prevent pitching, respectively, for aircraft 10. Wings 12 and horizontal stabilizers 14 include critical suction surfaces, such as upper surfaces 26 of wings 12 and lower surfaces 28 of horizontal stabilizers 14, where flow separation and loss of lift can occur if icing conditions form on any of the surfaces of wings 12 and horizontal stabilizers 14. FIG. 1 also shows structures with embedded CNT heating elements 30 mounted onto leading edges 18 of wings 12 and onto leading edges 20 of horizontal stabilizers 14. In other non-limiting embodiments, structures with embedded CNT heating elements 30 can be mounted onto any leading edge or non-leading edge surface of aircraft 10. Structures with embedded CNT heating elements 30 function generating heat so as to prevent ice from forming on or shed ice formed on any of the above noted surfaces. Further, it should be noted that the assemblies could be mounted to an engine lip and engine induction deicers generally shown by reference number 31.

Figure 2:
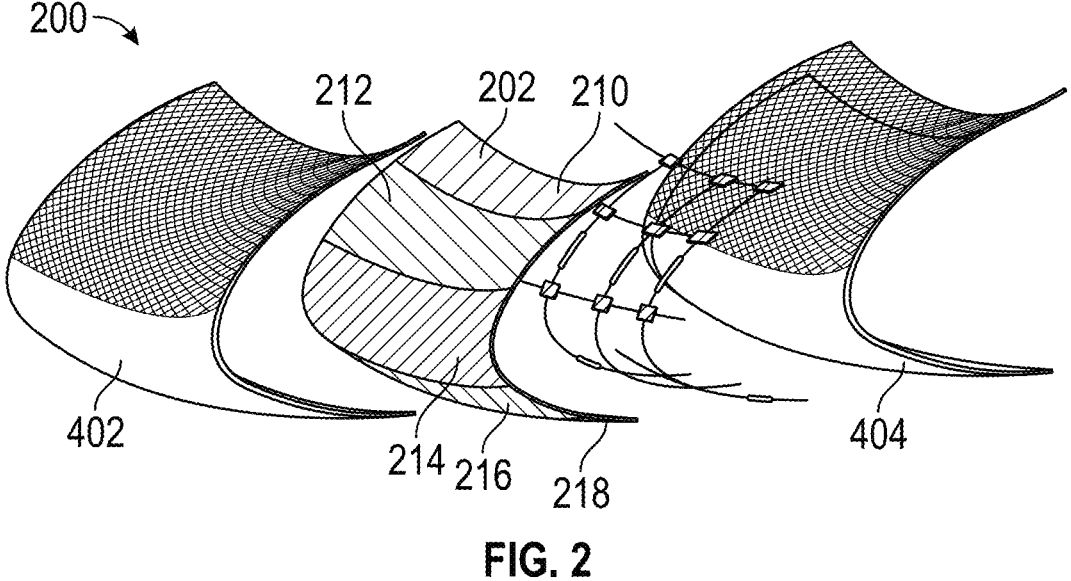
FIG. 2 shown an exploded view of a structure with embedded CNT heating elements according to one embodiment.

In more detail, and as shown in FIG. 2, there is provided in one embodiment, a multilayer structure 200 that includes a heater mat 202. In one embodiment, the heater mat is formed and a carbon nano-tube (CNT) heater.

Figure 3:
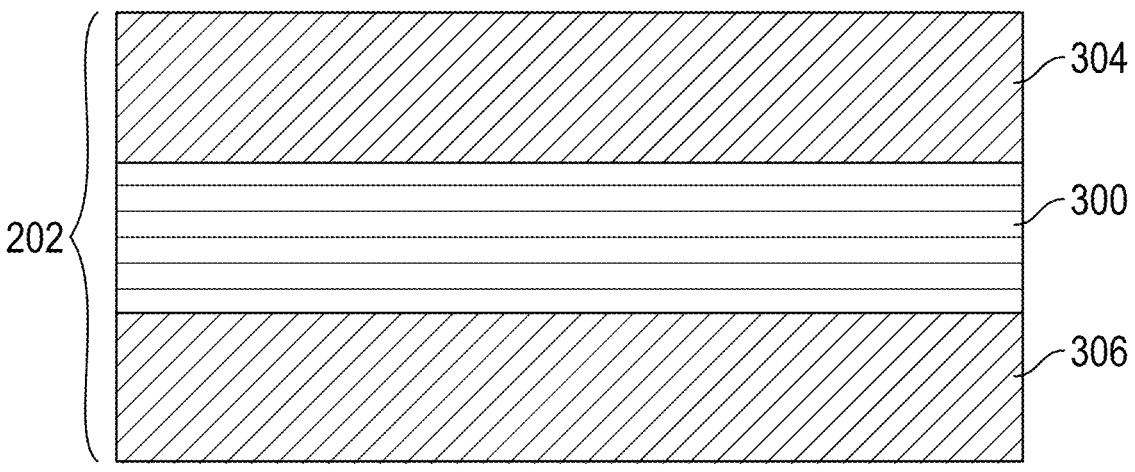
FIG. 3 shows a sectional view of a portion of the CNT heater shown in FIG. 2.

With reference also to FIG. 3, which shows a more detailed version of the CNT heater 202 of structure of FIG. 2. As illustrated, the CNT heater 202 includes a heating layer 300.

In a non-limiting example, the heating layer 300 includes at least one sheet of a carbon allotrope material, such as carbon nanotubes (CNT), which have a generally cylindrical structure. A CNT sheet can be formed from CNT suspended in a matrix, a dry CNT fiber, or a CNT yarn, to name a few non-limiting examples. In other embodiments, the carbon allotrope material of the CNT heater 202 includes graphene, graphene nanoribbons (GNRs), or other suitable carbon allotropes. Graphene has a two-dimensional honeycomb lattice structure, and GNRs are strips of graphene with ultra-thin widths.

Further, it should be noted that the heating layer 300 can be heating assembly that includes several layers. The layer 300 can include, for example, the structure as disclosed in U.S. Pat. No. 11,167,856 that includes a composite of CNT and silicon surrounded by metal layers. U.S. Pat. No. 11,167,856 is incorporated herein by reference.

As illustrated, the CNT heater 202 also includes first and second (or fore and aft) encapsulation layers 304, 306. The encapsulation layers are formed of a thermoplastic material. Examples of such materials that becomes molten when heated, solid when cooled, and can be re-melted or molded after cooling. The curing process is completely reversible, and doing so will not compromise the material's physical integrity.

Prior art CNT heaters typically utilize thermoset materials. In contrast to the encapsulation layers 304, 306 show in FIG. 3, using thermoset materials will create irreversible chemical bonds during curing. As such, a thermoset material cannot be melted/reversed, and this current state of the art makes repairing a heater or assembly difficult if not impossible.

Examples of materials that can be used as thermoplastic dielectric encapsulation layers 304, 306 include, but are not limited to polyether ether ketone (PEEK), thermoplastic polyimide, or Polyaryletherketone (PAEK).

It shall be understood that because the thermoplastic encapsulation layers 304, 306 can be heated and reformed, if there is damage to either them or the heating layer 300, the combination thereof can be heated and separated.

Figure 4:
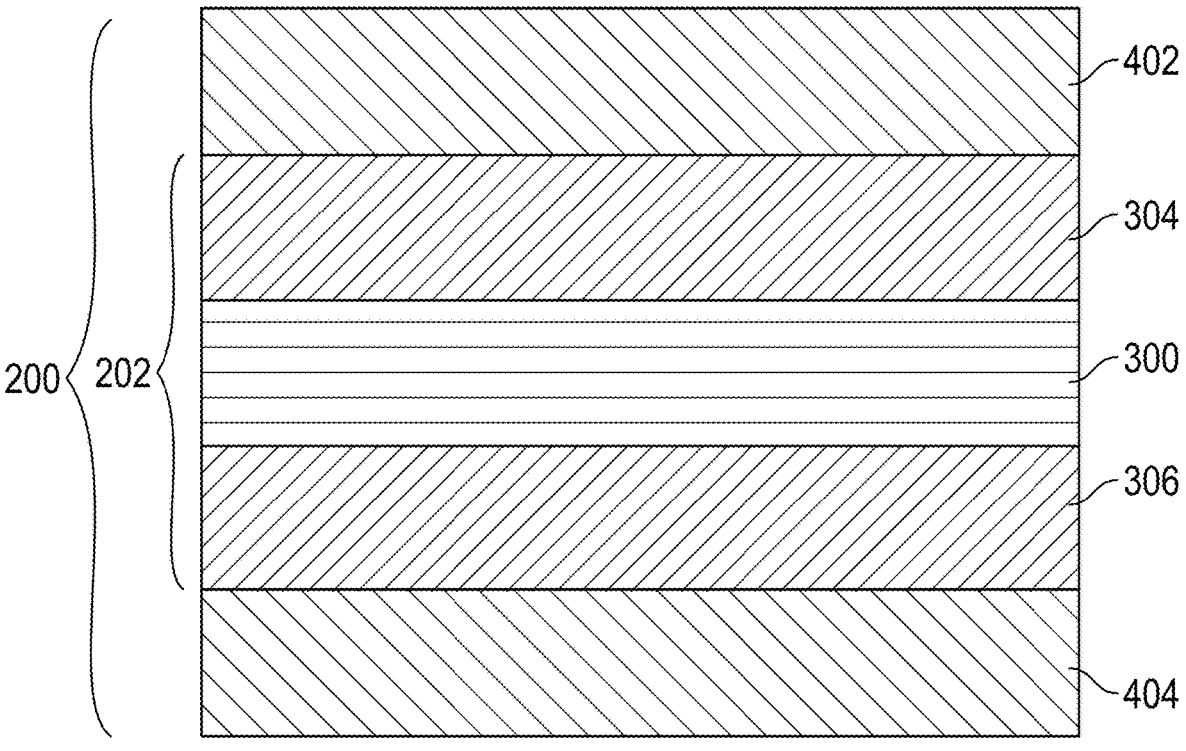
FIG. 4 shows a sectional view of a portion of the assembly shown in FIG. 2.

With reference now to FIGS. 2 and 4 an embodiment of a multilayer structure that includes a CNT heater 202 is illustrated. In this embodiment, the CNT heater 202 is surrounded by composite structures 402, 404. The composite structures 402, 404 can be formed of a thermoplastic in one embodiment. In one embodiment, the composite structures 402, 404 are formed of same thermoplastic as thermoplastic encapsulation layers 304, 306. In another, the composite structures 402, 404 are formed of a different thermoplastic than thermoplastic encapsulation layers 304, 306.

The CNT heater 202 can be provided and then bonded to the composite structures 402, 404 by adding heat. In one embodiment, some or all of the heat can be provided by the CNT heater.

Embodiments herein may reduce manufacturing complexity/costs and decrease power required from the heater mat during operation. This will also allow for the heater mat to be repaired or replaced instead of having to discard the entire structural component thus decreasing repair and maintenance costs. The use of a thermoplastic structure will also provide higher temp limits the heater mat can operate which could decrease design constraints. These features can apply to any of the following examples that are discussed.

It should be noted that while shown as being directly contacting one another, additional layers or adhesive materials can be disposed between the composite structures 402, 404 and the thermoplastic encapsulation layers 304, 306. Thus, the aft composite structure can directly contact the encapsulation layer 306 in some cases and be separated from (e.g., not in direct contact) it.

As shown in FIG. 2 and applicable to all embodiments herein, the composite structures 402, 404 can be formed to have a shape such they can be applied to any of the surfaces of an aircraft as shown above. The CNT heaters 202 can be formed into a flat or shaped mat and then place on one of the structures 402, 404 and then other of the structures 402, 404 is provided to encapsulate the CNT heater 202. The structure so formed can then be heated to at least partially melt them to bond the assembly together. Thus, one embodiment, a method of forming a structure that includes receiving a carbon nano-tube (CNT) heater as disclosed herein. The method can also include receiving a fore composite structure 402 that includes a fore composite structure thermoplastic material and an aft composite structure 404 that includes an aft composite structure thermoplastic material. The two structures 402, 404 can be placed on opposing sides of the CNT heater 202. OF course, as shown below, other layers or material could be placed between the CNT heater 202 and the structures 402, 404. Heat can then be applied to bond the assembly together.

Figure 5:
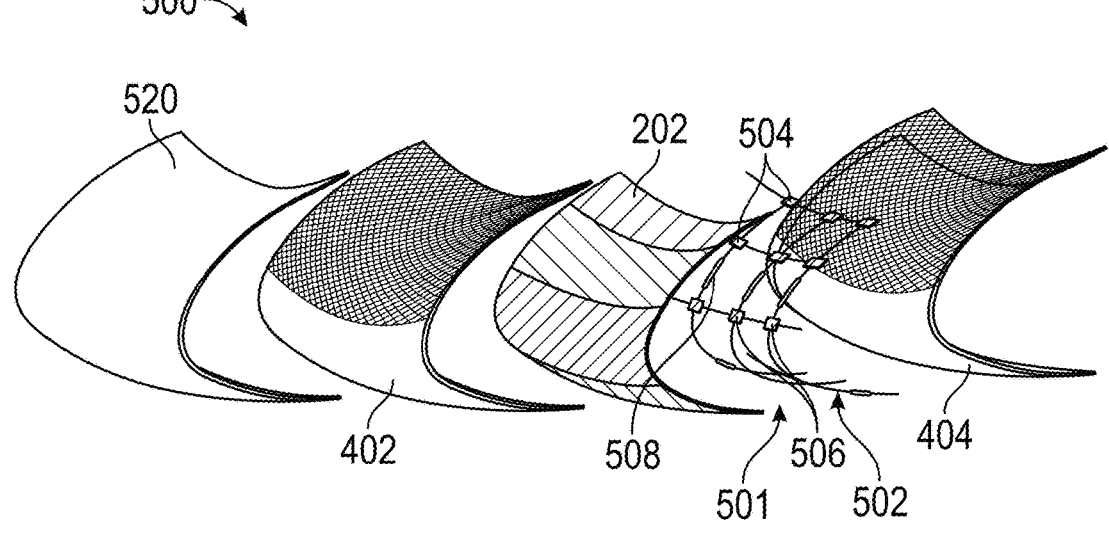
FIG. 5 shows an exploded view of a structure with embedded CNT heating elements according to one embodiment that includes addition layers relative to FIG. 2.

FIG. 5 shows another embodiment of an assembly. This assembly includes additional optional layers/elements. The elements include sensors located in a sensor layer 501 and the layer includes a low ice adhesion coating layer 520. It shall be understood that one embodiment is an assembly 700 that only includes the sensor layer 501 (see FIG. 7) and another assembly 800 can include only the low ice adhesion coating layer 520 (FIG. 8).

Figure 6:
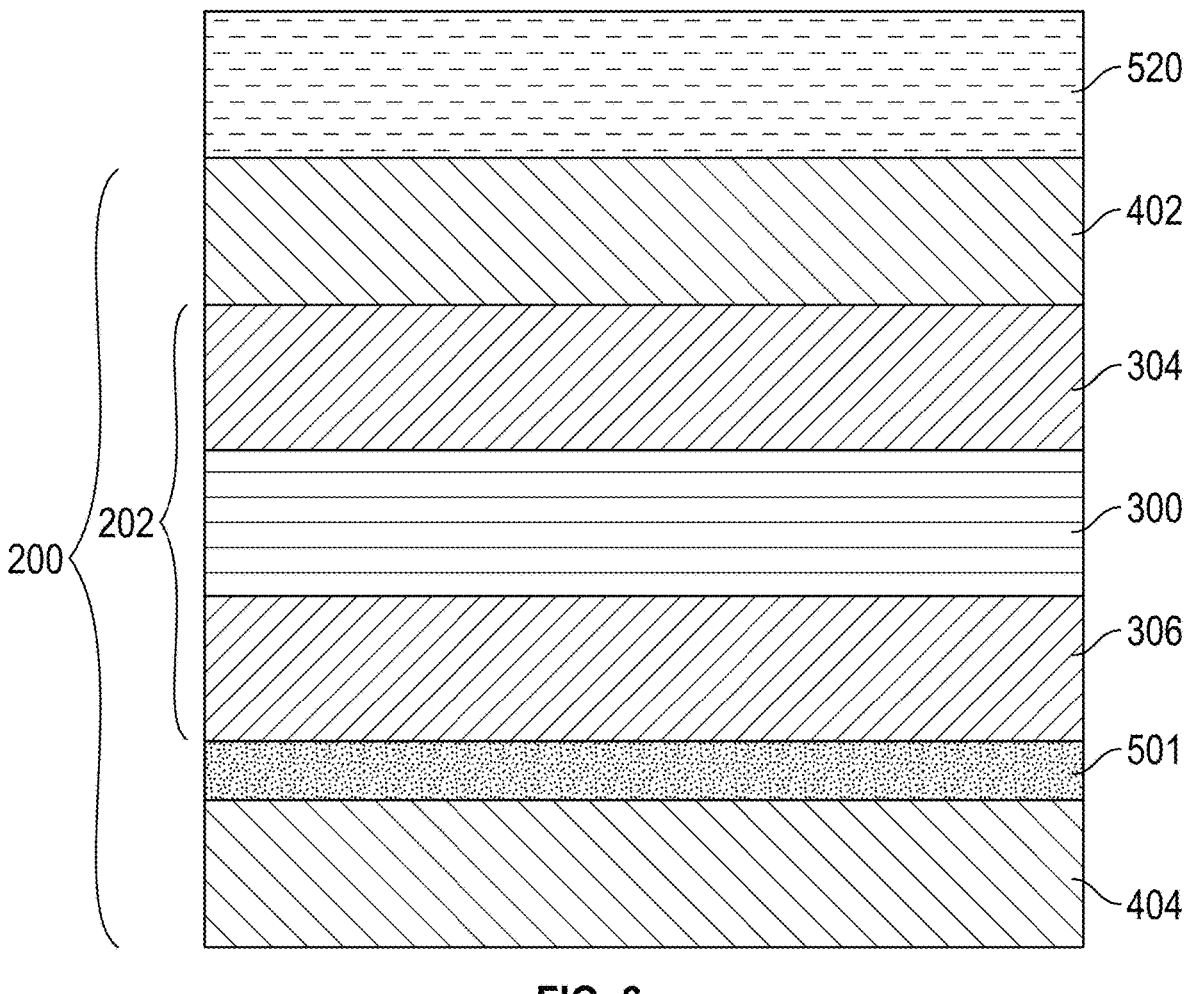
FIG. 6 shows a sectional view of a portion of assembly shown in FIG. 5.
Figure 7:
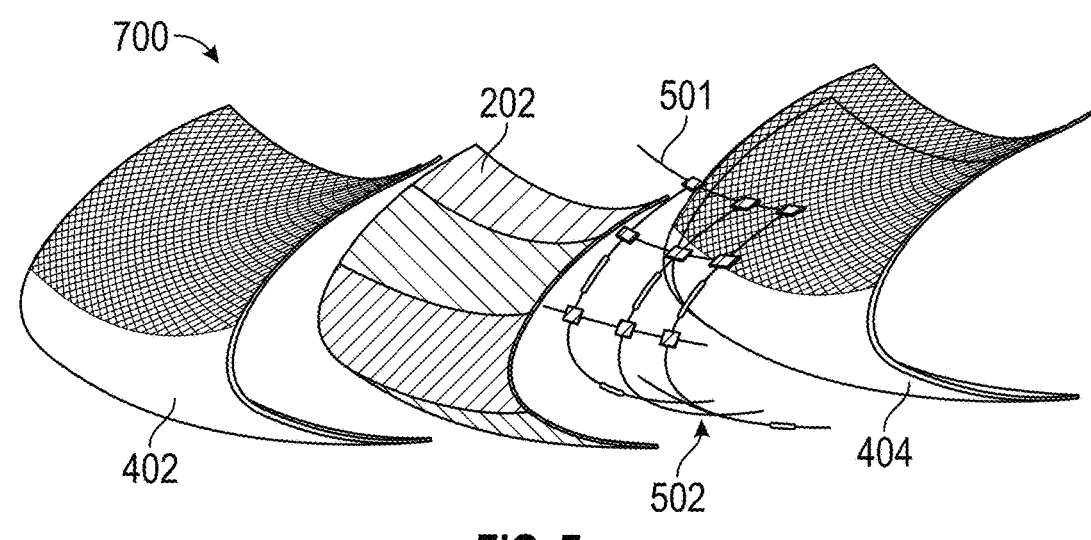
FIG. 7 shows an exploded view of a structure with embedded CNT heating elements according to one embodiment that includes only one of the additional layers of FIG. 5.

As illustrated in FIGS. 5-7, the sensor layer 501 includes sensors 502 are between the CNT heater 202 and the back or aft composite structure 404. Of course, the sensors elements 502 could alternatively be place between the CNT heater 202 and the fore or front composite structure 402.

In one embodiment, the sensors 502 are an array of fiber optic sensors that can detect one or both temperature and stress/strain on the assemblies 500, 600, 700.

Figures 8, 9:
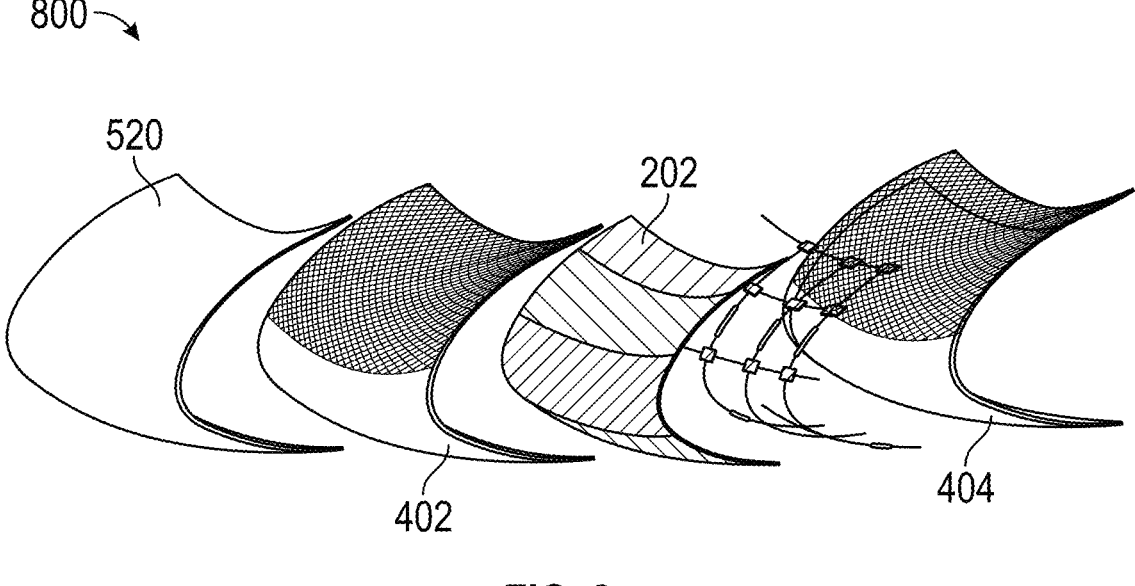
FIG. 8 shows an exploded view of a structure with embedded CNT heating elements according to one embodiment that includes only a different one of the additional layers of FIG. 5.
FIG. 9 shows an example sensor layer according to one embodiment.

As shown in FIGS. 5 and 9, the sensors 502 of the sensor layer 501 can include a plurality of temperature sensors 504 and a plurality strain gauge sensors 506. The sensors 504, 506 can be apart of a fiber optic cable 508 in one embodiment. Each fiber optic cable 508 can include both types of sensors 504, 506 which reduces the amount of additional wires that are needed to install the different type of sensors.

In one or more embodiments of the disclosure, the plurality of sensors 504, 506 is apart of each fiber optic cable 508, and the individual readings from sensors 504, 506 on the same fiber optic cable 508 can be processed by, for example, a controller 550 in a variety of ways.

For example, the controller 550 can process each signal from corresponding sensors 504, 506 using a known time delay or wavelength. Each of the sensors 504, 506 can be associated with a particular location of the aircraft for mapping. FIG. 5 illustrates a fixed number of sensors, however, it should be understood that any number of sensors and placement of the sensors can be used. In addition, although the arrangement of fiber optic-based sensors is on a surface of a substrate 550, it can be appreciated the sensors can be placed directly on the for or aft composite structure 402, 404. Thus, in one embodiment the sensor layer includes a substrate 550 that supports the sensors and in another it does not.

As shown, the cables 508 extend in the horizontal direction in FIG. 9 and the vertical direction in FIGS. 5 and 7 to illustrate that either orientation is possible. In the non-limiting example, the sensors 504, 506 can be arranged in a manner that they line up with a plurality of zones 210-218 of the heater 202 for monitoring the various zones. The zones in the heater 202 are shown in FIG. 2 but can apply to all CNT heaters disclosed herein and the orientation can be vertical or horizontal as shown. Example correspondence to the zones in FIG. 2 is shown in FIG. 9.

The low ice adhesion coating layer 520 of FIGS. 5, 6 and 8 can be any type of coating on which it is difficult for ice to adhere. The low ice adhesion coating layer may comprise polydimethylsiloxane (PDMS), at least one of nanoscale amorphous silica and super hydrophobic nanoparticles, and at least one of a non-reactive hydrophobic additive and a non-reactive hydrophilic additive. The coating may further comprise fluoride. An example of such a layer is more fully described U.S. Patent Application Publication No. US20210179276A1 which is incorporated herein by reference.

In addition, the low ice adhesion coating layer 520 could be an Ice Phobic Material where any water that runs across it does not turn to ice due to the low ice adhesion. An example of such a material may have low ice adhesion, at least below 200 psi (pounds per square inch), preferably below 100 psi, and typically below 45 psi. Such materials includes multiscale crack initiator promoted super-low ice adhesion surfaces, Slippery Liquid-Infused Nanostructured Surfaces (SLIPS), HygraTek, HybridShield0 by NanoSonic ice phobic coatings, PPG IcePhobic Coating, NANOMYTE SuperAi by NEI Corporation, or other materials/coatings with low ice adhesion. Examples and usage are more fully described U.S. Pat. No. 10,875,632 which is incorporated herein by reference.

The low ice adhesion coating layer 520 can include health monitoring capabilities as well.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for controlling ice accumulation on a surface of an aircraft, the system comprising:
    a carbon nano-tube (CNT) heater comprising:
        a CNT layer;
        a first encapsulation layer disposed on a first side of the CNT layer formed of a first encapsulation layer thermoplastic material; and
        a second encapsulation layer disposed on a second side of the CNT layer formed of a second encapsulation layer thermoplastic material;
    a fore composite structure that includes a fore composite structure thermoplastic material disposed on the first side of CNT heater;
    an aft composite structure that includes an aft composite structure thermoplastic material disposed on the first side of CNT heater; and
    a sensor layer that includes a temperature sensor, the layer disposed between the CNT heater and the aft composite structures.

2. The system of claim 1, further comprising:
    a controller that receives information from sensors in the sensor layer and controls the CNT heater based on the received information.

3. The system of claim 2, further comprising a low ice adhesion coating layer disposed on the fore composite structure on a side of the fore composite structure opposite the CNT heater.

4. The system of claim 1, further comprising a low ice adhesion coating layer disposed on the fore composite structure on a side of the fore composite structure opposite the CNT heater.

5. The system of claim 1, wherein the sensor layer includes both temperature and strain sensors.

6. The system of claim 1, wherein the sensor layer includes fiber optic sensors.

7. The system of claim 1, wherein the fore and aft composite structure thermoplastic materials are the same thermoplastic material.

8. The system of claim 7, wherein the fore and aft composite structure thermoplastic materials are the same as thermoplastic material of the first and second encapsulation layer thermoplastic materials.

9. A method of forming a multilayer heating structure for controlling ice accumulation on a surface of an aircraft, the structure comprising:
    receiving a carbon nano-tube (CNT) heater comprising: a CNT layer, a first encapsulation layer disposed on a first side of the CNT layer formed of a first encapsulation layer thermoplastic material a second encapsulation layer disposed on a second side of the CNT layer formed of a second encapsulation layer thermoplastic material;
    receiving a fore composite structure that includes a fore composite structure thermoplastic material;
    receiving a sensor layer that includes one or more temperature sensors;
    disposing the fore composite structure on the first side of CNT heater;
    receiving an aft composite structure that includes an aft composite structure thermoplastic material;
    disposing the sensor layer the second side of the CNT heater structure;
    disposing the aft composite structure on the second side of CNT heater such that the sensor layer is between the CNT heater and the aft composite structure to form an assembly that includes the fore composite structure, the CNT heater, the sensor layer and the aft composite structure; and
    heating the assembly to at least partially melt the fore and aft composite structure thermoplastics and the first and second encapsulation layer thermoplastic to bond the assembly together.

10. The method of claim 9, wherein heating includes providing heat with the CNT heater.

11. The method of claim 10, wherein the fore and aft composite structure thermoplastic materials are the same thermoplastic material.

12. The method of claim 9, wherein the fore and aft composite structure thermoplastic materials are the same as thermoplastic material of the first and second encapsulation layer thermoplastic materials.

13. The method of claim 9, further comprising:
    disposing a low ice adhesion coating layer on the fore composite structure on a side of the fore composite structure opposite the CNT heater.

* * * * *